United States Patent [19]

Ikejiri et al.

[11] Patent Number: 5,118,207
[45] Date of Patent: Jun. 2, 1992

[54] ROLLING BEARING CAGES

[75] Inventors: Fumitoshi Ikejiri, Kuga; Noboru Umemto, Inabe, both of Japan

[73] Assignee: Mitsui Petrochemical Industries, Ltd., Tokyo, Japan

[21] Appl. No.: 708,849

[22] Filed: May 31, 1991

Related U.S. Application Data

[63] Continuation of Ser. No. 608,271, Nov. 2, 1990, abandoned.

[30] Foreign Application Priority Data

Oct. 27, 1989 [JP] Japan .................. 2-280845

[51] Int. Cl.⁵ .................................. F16C 33/44
[52] U.S. Cl. ..................... 384/527; 384/576; 384/908; 384/911
[58] Field of Search ........... 384/527, 576, 908, 911, 384/531, 572

[56] References Cited

U.S. PATENT DOCUMENTS

| | | | |
|---|---|---|---|
| 3,006,382 | 10/1961 | Broome | 384/908 |
| 3,027,626 | 4/1962 | Murphy | 374/527 |
| 4,169,636 | 10/1979 | Hooper | 384/527 |
| 4,603,166 | 7/1986 | Poppe et al. | |
| 4,997,295 | 3/1991 | Saitou | 384/527 |

FOREIGN PATENT DOCUMENTS

| | | |
|---|---|---|
| 0121984 | 10/1984 | European Pat. Off. |
| 0291096 | 11/1988 | European Pat. Off. |
| 59-155426 | 4/1984 | Japan |

*Primary Examiner*—Lenard A. Footland
*Attorney, Agent, or Firm*—Sherman and Shalloway

[57] ABSTRACT

Rolling bearing cages disclosed herein are prepared from compositions comprising an aromatic polyamide which comprises terephthalic acid constituent units, aromatic dicarboxylic acid constituent units other than terephthalic acid constituent units and straight-chain aliphatic alkylenediamine constituent units, and glass fibers, and can be easily incorporated into bearing races without damage, resultant bearings capable of being operated over a long period of time without deformation of said cages and deterioration of the lubricant oil.

5 Claims, 1 Drawing Sheet

ROLLING BEARING CAGES

This is a continuation of application Ser. No. 07/608,271 filed Nov. 2, 1990, now abandoned.

FIELD OF THE INVENTION

The present invention relates to rolling bearing cages made of plastics and capable of being used at high temperatures.

BACKGROUND OF THE INVENTION

In general, rolling bearings are roughly classified into ball bearings and roller bearings in accordance with the types of rolling elements, and they are further subclassified. That is to say, ball bearings are typically classified into general type ball bearings, crown type ball bearings, thrust ball bearings for angular contact bearings, etc. There are ball bearing cages corresponding to the classified respective ball bearings described above. On the other hand, roller bearings are classified into tapered roller bearings, barrel shaped roller bearings, cylindrical roller bearings, thrust roller bearings, thrust barrel shaped roller bearings, etc., and there are roller bearing cages corresponding to the classified respective roller bearings described above.

Plastics-made rolling bearing cages (abbreviated to cages hereinafter) are ordinarily prepared from polyamide resins (so-called nylon) due to their excellent moldability, excellent mechanical characteristics such as flexibility and excellent productivity such as low material cost, and the nylon cages are widely used. For example, crown type cages, major portions of which are shown in FIG. 1, have a tooth portion 2, and can be freely rotatably held by incorporating a rolling element 4 into a pocket portion 3 having a narrow inlet and exit.

Conventional nylon cages 1, however, deteriorate their characteristics as nylon when continuously used at temperatures no less than 120° C. or used under conditions wherein the nylon cages are contacted with (1) oil containing an extreme pressure additive or other additives, or (2) other acidic chemicals, and therefore they cannot be used in a good condition.

There are polyphenylene sulfide resins (abbreviated to PPS resins hereinafter) which can be used at high temperatures in place of nylon and which can be prepared at relatively low cost. The PPS resins are excellent in chemical resistance, moldability, etc., as well as thermal resistance. There are two types of PPS resins, that is, one is a crosslinked PPS resin (also designated as a branched PPS resin) and the other is a straight-chain PPS resin. The crosslinked PPS resin is prepared, for example, by heating in the air a PPS resin having a melt viscosity just after polymerization as low as about 20 to 100 poise and a low molecular weight at a temperature of not higher than its melting point to oxidize and crosslink to obtain a crosslinked PPS resin having an increased melt viscosity. The crosslinked PPS resin is also prepared by adding a crosslinking agent or a branching agent thereto to introduce a crosslinked or a branched structure and to increase the melt viscosity.

The crosslinked PPS resin thus obtained becomes, however, markedly brittle and lacks in flexibility, though it has a high melt viscosity, that is, improved thermal resistance. Accordingly, said PPS resin is not suited for rolling bearing cages which are required to have flexibility when the rolling element 4 is incorporated into the pocket portion 3.

On the other hand, the straight-chain PPS resin is a resin prepared by linearly growing its molecular chain so that the resin has a high molecular weight in the polymerization step, and the resin is characterized in that it is very flexible and highly tough. Japanese Patent Publication No. 79419/1989 discloses that the straight-chain PPS resin is useful for rolling bearing cages. Though the bearing cages composed of the straight-chain PPS resin is excellent in easiness of construction during assembling, they have low thermal stability and inferior mechanical characteristics such as creep resistance characteristics at high temperatures (not less than 150° C). Accordingly, bearing cages prepared from the PPS resin are deformed by centrifugal force, and come into contact with the outer race to generate extraordinary friction heat. As a result, the lubricant used in the bearing is deteriorated, and the quality of the bearings is lowered.

Examples of plastics used for rolling bearing cages which are used at high temperatures exceeding 150° C. include so-called superengineering plastics such as polyether sulfone (abbreviated to PES hereinafter), polyether imide (abbreviated to PEI hereinafter), polyamide-imide (abbreviated to PAI hereinafter) and polyether ether ketone (abbreviated to PEEK hereinafter).

These plastics are, however, very expensive, and have problems with regard to physical properties when used as bearing cages, for example, appropriate flexibility and fatigue resistance necessary for molding or assembling for the manufacture of the bearing cages, though they are excellent in thermal and chemical resistance. Accordingly, they have not come to be used widely.

Conventional polyamide resins have, as described above, low thermal resistance, and cannot be used as rolling bearing cages when continuously used at temperatures not less than 120° C. Other engineering plastics have low flexibility, moldability and oil resistance, though they have sufficient thermal resistance. They are, therefore, not preferable for rolling bearing cages.

OBJECT OF THE INVENTION

The present invention is intended for solving such various problems associated with the prior art as mentioned above, and an object of the invention is to provide rolling bearing cages prepared from an aromatic polyamide composition, capable of being easily constructed into bearing races, and showing no damage of the resulting bearings used at high temperatures.

SUMMARY OF THE INVENTION

The rolling bearing cages of the present invention are prepared from a polyamide resin composition comprising:

(i) an aromatic polyamide which comprises (a) aromatic dicarboxylic acid constituent units comprising 60 to 100% by mole of terephthalic acid constituent units and 0 to 40% by mole of aromatic dicarboxylic acid constituent units other than terephthalic acid constituent units, and (b) straight-chain aliphatic alkylenediamine constituent units having 6 to 18 carbon atoms, said aromatic polyamide having an intrinsic viscosity [η] of 0.5 to 3.0 dl/g as measured in concentrated sulfuric acid at 30° C; and (ii) glass fibers having a diameter of 3 to 7 μm.

Figure 1:
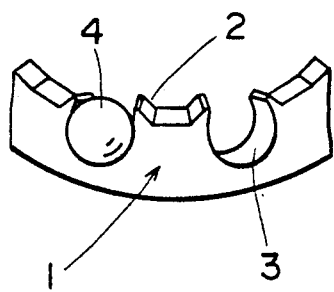
FIG. 1 is a perspective view of main portions of a rolling bearing cage.

1 —a bearing cage, 2 —a tooth portion, 3. —a pocket portion, 4 —a rolling element, 5 —bearing races

DETAILED DESCRIPTION OF THE INVENTION

The rolling bearing cages of the present invention are illustrated in detail below.

In the present invention, there has been adopted, as means for solving the problems described above, a composition as material for rolling bearing cages, comprising:

an aromatic polyamide which comprises (a) aromatic dicarboxylic acid constituent units comprising 60 to 100% by mole of terephthalic acid constituent units and 0 to 40% by mole of aromatic dicarboxylic acid constituent units other than terephthalic acid constituent units, and (b) straight-chain aliphatic alkylenediamine constituent units having 6 to 18 carbon atoms, said aromatic polyamide having an intrinsic viscosity $[\eta]$ of 0.5 to 3.0 dl/g as measured in concentrated sulfuric acid at 30° C; and glass fibers having each a diameter of 3 to 7 $\mu$m.

The aromatic polyamide used for the rolling bearing cages of the invention is a polyamide which comprises (a) aromatic dicarboxylic acid constituent units comprising 60 to 100% by mole of terephthalic acid constituent units and 0 to 40% by mole of aromatic dicarboxylic constituent units other than terephthalic acid constituent units, and (b) straight-chain aliphatic alkylenediamine constituent units having 6 to 18 carbon atoms, said aromatic polyamide having an intrinsic viscosity $[\eta]$ of 0.5 to 3.0 dl/g, preferably 0.6 to 2.5 dl/g as measured in concentrated sulfuric acid at 30° C.

Concrete examples of the aromatic dicarboxylic acid constituent units (a) which compose the aromatic polyamide of the invention include those derived from terephthalic acid, isophthalic acid, phthalic acid, 2-methylterephthalic acid and naphthalenedicarboxylic acid. The aromatic dicarboxylic acid constituent units (a) may be composed of only terephthalic acid constituent units, and they may also be a mixture of terephthalic acid constituent units and such aromatic dicarboxylic acid constituent units other than terephthalic acid constituent units as exemplified above. In either one of the above-mentioned two cases, the aromatic dicarboxylic acid constituent units (a) are preferably composed of 60 to 100% by mole of terephthalic acid and 0 to 40% by mole of aromatic dicarboxylic acid constituent units other than terephthalic acid constituent units.

Moreover, in the case where the straight-chain aliphatic alkylenediamine constituent units (b) which compose the aromatic polyamide of the invention are those having each 6 carbon atoms, the aromatic dicarboxylic acid constituent units (a) particularly preferably comprise 60 to 85% by mole of terephthalic acid constituent units and 15 to 40% by mole of aromatic dicarboxylic acid constituent units other than terephthalic acid constituent units, because the rolling bearing cages prepared from such aromatic polyamide come to have improved thermal resistance characteristics such as thermal deformation temperature, improved mechanical characteristics such as flexural strength and wear resistance, improved chemical resistance such as lubricant resistance at high temperatures, and improved moldability.

In the case where the straight-chain aliphatic alkylenediamine constituent units (b) which compose the aromatic polyamide of the invention are those having each 8 carbon atoms, the aromatic dicarboxylic acid constituent units (a) particularly preferably comprise 65 to 100% by mole of terephthalic acid constituent units and 0 to 35% by mole of aromatic dicarboxylic acid constituent units other than terephthalic acid constituent units, because the rolling bearing cages prepared from the such aromatic polyamide come to have improved thermal resistance characteristics such as thermal deformation temperature, improved mechanical characteristics such as flexural strength and wear resistance, improved chemical resistance such as lubricant resistance at high temperatures and improved moldability.

In the case where the straight-chain aliphatic alkylenediamine constituent units (b) which compose the aromatic polyamide of the invention are those having 10 to 18 carbon atoms, the aromatic dicarboxylic acid constituent units (a) particularly preferable comprise 75 to 100% by mole of terephthalic acid constituent units and 0 to 25% by mole of aromatic dicarboxylic acid constituent units other than terephthalic acid constituent units, because the rolling bearing cages prepared from such aromatic polyamide come to have improved thermal resistance characteristics such as thermal deformation temperature, improved mechanical characteristics such as flexural strength and wear resistance, improved chemical resistance such as lubricant resistance at high temperatures and improved moldability.

When the aromatic dicarboxylic acid constituent units (a) comprise less than 60% by mole of terephthalic acid constituent units and greater than 40% by mole of aromatic dicarboxylic acid constituent units other than terephthalic acid constituent units, rolling bearing cages prepared from such polyamide come to show lowering of thermal characteristics such as thermal deformation temperature, mechanical characteristics such as tensile strength and wear resistance, chemical resistance such as lubricant oil resistance at high temperatures, and chemical and physical characteristics such as water resistance.

Of the aromatic dicarboxylic acid constituent units other than terephthalic acid constituent units in the aromatic dicarboxylic constituent units (a) which compose the aromatic polyamide of the invention, preferred are isophthalic acid constituent units or naphthalenedicarboxylic acid constituent units, and particularly preferred are isophthalic acid constituent units. Furthermore, though the aromatic dicarboxylic acid constituent units (a) which compose the aromatic polyamide of the invention mainly comprise terephthalic acid constituent units and the aromatic dicarboxylic acid constituent units other than terephthalic acid constituent units as described above, the aromatic dicarboxylic acid constituent units (a) may also include a small amount of other constituent units derived from a polybasic acid having at least tribasicity such as trimellitic acid and pyromellitic acid in addition to the above-mentioned essential constituent units.

The straight-chain aliphatic alkylenediamine constituent units (b) which compose the aromatic polyamide of the present invention are derived from a straight-chain aliphatic alkylenediamine having 6 to 18 carbon atoms. Concrete examples of the above-described straight-chain aliphatic alkylenediamine include 1,6-diaminohexane, 1,7-diaminopheptane, 1,9-diaminononane, 1,10-diaminodecane, 1,11-diaminoundecane and 1,12-diaminododecane. Of these straight-chain aliphatic alkylenediamine constituent units (b), particularly preferred are those derived from 1,6-diaminohexane.

The above-mentioned aromatic polyamide used in the invention can be manufactured by various known processes. For example, the aromatic polyamide can be prepared by solution polycondensation or interfacial polycondensation of a diacyl halide of an aromatic dicarboxylic acid corresponding to the above-mentioned aromatic dicarboxylic acid constituent units (a) which compose the aromatic polyamide, and a straight-chain alkylenediamine corresponding to the above-mentioned straight-chain aliphatic alkylenediamine constituent units (b), as published in the following literature: Paul W. Morgan, "Condensation Polymers by Interfacial and Solution Methods", Polymer Reviews, 10, Interscience Publishers (1965); and Von H. Hopff and A. Krieger, Makromol. Chem., 47, 93–113 (1961). The aromatic polyamide may also be prepared by another process. That is, at first an oligomer is prepared by heating a nylon salt of the aromatic dicarboxylic acid corresponding to the above aromatic dicarboxylic acid constituent units (a) and the straight-chain aliphatic alkylenediamine corresponding to the above straight-chain alkylenediamine constituent units (b), and then the oligomer is melt polymerized or solid phase polymerized. The aromatic polyamide of the invention may be prepared by either one of the above-described processes.

In the present invention, glass fibers are obtained from inorganic glass containing $SiO_2$, $B_2O_3$, $Al_2O_3CaO$, $Na_2O$, $K_2O$, etc. The inorganic glass includes alkali-free glass (abbreviated to E glass) and alkali-containing glass (abbreviated to C glass or A glass), and E glass is preferably employed in the invention.

The preferable diameter and length of the glass fibers are 3 to 7 μm and 0.05 to 6 mm, respectively. Rolling bearing plastic cages obtained by molding a resin incorporated with glass fibers having each a diameter of greater than 7 μm lack in flexibility, and show no easiness in construction during assembling. The resin composition incorporated with glass fibers having each a diameter of less than 3 μm has lowering mechanical strength, and it is deformed at high temperatures when used as rolling bearing cages. Moreover, the resin composition incorporated with glass fibers having each a length longer than 6 mm has markedly lowering flexibility and moldability. The resin composition lowering with glass fibers having each a length shorter than 0.05 mm has lowering mechanical strength. Accordingly, these resin compositions are not preferably used for rolling bearing cages.

In the present invention, glass fibers having each a diameter of 3 to 7 μm is so added that the resultant aromatic polyamide composition comprises the glass fibers in an amount of 1 to 80% by weight, preferably 5 to 50% by weight based on a total amount of the aromatic polyamide and the glass fibers. Moreover, the fibrous reinforcing materials may also be treated with a silane coupling agent such as aminosilane, epoxysilane and mercaptosilane, a sizing agent including a Cr type coupling agent and greige goods for collecting fibers to afford affinity with the aromatic polyamide.

Various fillers may be added to the resin compositions so long as the addition does not impair the effect of the invention. Examples of such fillers include organic heat-resistant polymer materials such as an aromatic polyether ketone resin, a polyether imide resin, a polyether sulfone resin, a polyamide-imide resin, a polyphenylene sulfide resin, a phenolic resin, an aromatic polyester resin, a polyimide resin, a silicone resin and a fluororesin, inorganic powder for improving thermal conductivity such as graphite, metal including Zn, Al and Mg, and oxide, inorganic powder such as glass beads, silas balloons, diatomaceous earth, asbestos, magnesium carbonate, calcium carbonate, calcium oxide, calcium fluoride and calcium hydroxide, inorganic powder for improving lubricating properties such as molybdenum disulfide, graphite, carbon, mica, talc and molybdenum trioxide, inorganic pigments such as iron oxide, cadmium sulfide, cadmium selenide and carbon black, internally lubricating additives such as silicone oil, ester oil, fluorooil, polyphenylene ether oil, wax and zinc stearate, heat-resistant inorganic single component fibers such as carbon fibers, graphite fibers, potassium titanate whiskers, wollastonite, silicon carbide whiskers, sapphire whiskers, steel wire, copper wire and stainless wire, heat-resistant inorganic composite fibers such as so-called boron fibers prepared by vapor depositing boron on tungsten core wire, carbon fibers, etc., and so-called silicon carbide fibers prepared by vapor depositing silicon carbide on tungsten core wire, carbon fibers, etc., heat-resistant organic fibers such as aromatic polyamide fibers, and an antioxidant.

There is no restriction with regard to the method for mixing the above-mentioned aromatic polyamide and the glass fibers having a diameter of 3 to 7 μm and other additives. The above-mentioned components may be each separately fed to a melt mixer, or they may be dry mixed at first by a mixer such as a Henschel mixer, a ball mill and a tumbler mixer and then pelletized after melt mixing the mixture by a hot roll, a kneader, a Bambury mixer, a screw extruder and the like. The resultant pellets are melt molded into a rolling bearing cage having a predetermined shape by an injection molding machine, etc.

EFFECT OF THE INVENTION

As is evident from the above-described illustration, the bearing cages of the present invention have good flexibility, can be easily assembling into bearings, and the bearings are not damaged even when used at high temperatures due to low deformation ratios of the bearing cages. In addition, the bearing cages also have excellent thermal resistance and mechanical characteristics that aromatic polyamides inherently have. Accordingly, the bearing cages can be utilized in extensive fields such as the automotive industry, the general instrument industry and the electric and electronic industry.

The present invention is illustrated below with reference to examples, but it should be construed that the invention is in no way limited to those examples.

All the materials used in the examples and comparative examples of the present invention are listed below.

(1) Aromatic polyamide

The aromatic polyamide was prepared by a procedure described below.

A 1 liter reaction vessel was charged with 254 g (2.19 moles) of 1,6-diaminohexane, 247 g (1.49 moles) of terephthalic acid, 106 g (0.64 mole) of isophthalic acid, 0.45 g ($4.25 \times 10^3$ mole) of sodium hypophosphite to be used as a catalyst and 148 ml of ion-exchanged water, and the vessel was purged with nitrogen. The content was heated at 250° C. under a pressure of 35 kg/cm² for 1 hour to conduct the reaction. The content was drawn to a container having an internal pressure about 10 kg/cm² lower than that of the reaction vessel to obtain 545 g of a polyamide having an intrinsic viscosity [$\eta$] of 0.10 dl/g as measured in concentrated sulfuric acid at 30° C.

The polyamide was then dried, and melt polymerized by using a biaxial extruder at a cylinder temperature of 330° C. to obtain an aromatic polyamide having an intrinsic viscosity [$\eta$] of 1.1 dl/g as measured in concentrated sulfuric acid at 30° C. The aromatic polyamide comprised 71% by mole of terephthalic acid constituent units, and had a melting point of 320° C.

(2) Polyamide (6,6-nylon) resin (trade name of Ultramid A3HG5, containing 25% of glass fibers GF, from BASF)

(3) Polyamide (4,6-nylon) (containing 30% of glass fibers GF, from Yunitika K.K)

(4) PPS resin (trade name of KPS-#214, from Kureha Kagaku Kogyo)

(5) PPS resin (trade name of P-4, from Phillips Petroleum International)

(6) Glass fibers (trade name of CS03DE-FT2A, having each a fiber diameter of 6 μm and a fiber length of 3 mm, from Asahi Fiber Glass K.K.)

(7) Glass fibers (trade name of CS03DE-FT562, having a fiber diameter of 6 μm and a fiber length of 3 mm, from Asahi Fiber Glass K.K.)

(8) Glass fibers (trade name of CS03MA-FT2A, having a fiber diameter of 13 μm and a fiber length of 3 mm, from Asahi Fiber Glass K.K.)

(9) Tetrafluoroethylene resin (trade name of KTL-610, from Kitamura K.K.)

The above-mentioned materials excluding those mentioned in (2) and (3) were dry mixed by a Henschel mixer in ratios listed in Table 1 below, and injection molded under melt mixing and injection molding conditions listed in Table 1 to form a cage 1 shown in FIG. 1 of a bearing 6203. Several tests described below were conducted on the cages thus obtained.

(1) Construction test of the cage during assembling a bearing

Figure 2:
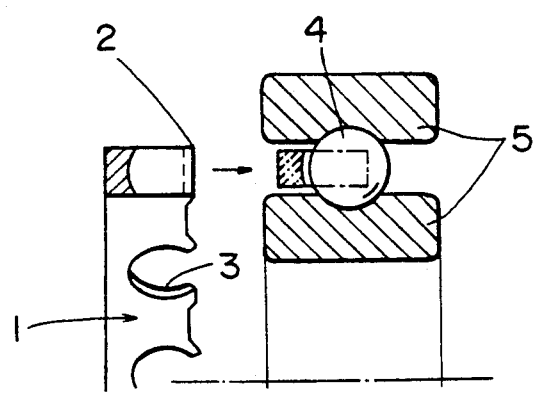
FIG. 2 is a sectional view showing a relationship between a rolling bearing cage and a bearing for investigating easiness of insertion steel balls.
Figure 3:
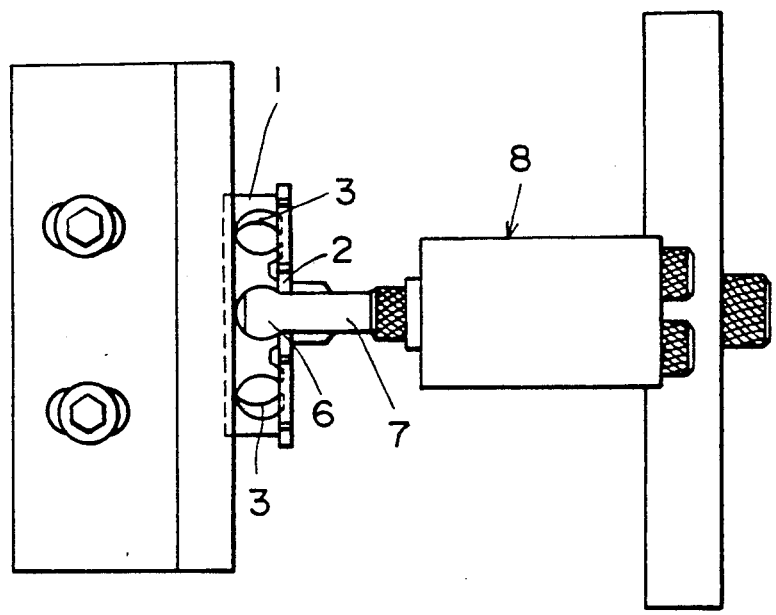
FIG. 3 is a plan view of a testing machine used in a durability test for the tooth portion of a rolling bearing cage.

A cage 1 was practically inserted between bearing races 5 by a mini-press as shown in FIG. 2, and degree of damage caused by a rolling element 4 (steel ball) at the tooth portion 2 in the cage 1 and easiness of the assembling were observed. The results were judged with reference to the following reference standards, and shown in Table 1.

(i) Degree of damage at the tooth portion of the cage
○— no damage
Δ— slight damage
x — serious damage (ii) Easiness of insertion of steel balls into the cage
○— without difficulty during assembling
Δ— with slight resistance during assembling
X — with marked resistance during assembling (2) Durability test of the tooth portion of the cage A rod 7 having a steel ball portion 6 with a diameter of 7.16 mm was repeatedly inserted in the pocket portion 3 of a cage 1 and withdrawn therefrom at a rate of 50 times/min until the tooth portion 2 was broken, and the number of insertion and withdrawal was listed in Table 1. The tooth portion 2 of the cage 1 has high fatigue strength when the number is large, and therefore rolling elements 4 can then be inserted into the cage 1 without high risk of destruction.

(3) Test for measuring a deformation ratio of the cage

A bearing 6203 in which 0.8 g of a lubricant (trade name of ET-130, urea type grease, from Kyodo Yushi K.K.) was applied was sealed with fluororubber. The bearing was operated for 200 hours at 15,000 rpm, under a thrust load of 6.8 kgf at a temperature of 180° C., and the resultant dimension deformation ratio of the outside diameter of the cage was measured. The cage is less deformed when the dimension deformation ratio is smaller.

(4) Test for judging deterioration degree of a lubricant

A bearing was operated for 200 hours under the same conditions with those described in (3), and the deterioration degree of the above-mentioned lubricant was judged and listed in Table 1 with marks described below.
○— discoloration without deterioration
Δ— discoloration with slight deterioration
X — discoloration with marked deterioration

TABLE 1

| | | Example 1 | Example 2 | Example 3 | Comp. Example 1 | Comp. Example 2 | Comp. Example 3 | Comp. Example 4 | Comp. Example 5 |
|---|---|---|---|---|---|---|---|---|---|
| ** Polyamide | (1)Aromatic polyamide | 80 | 75 | 65 | 80 | — | — | — | — |
| | (2)6,6-Nylon A3HG5 | — | — | — | — | 100 | — | — | — |
| | (3)4,6-Nylon containing 30% GF | — | — | — | — | — | 100 | — | — |
| Other resins | (4)KPS-#214 | — | — | — | — | — | — | 75 | — |
| | (5)P-4 | — | — | — | — | — | — | — | 80 |
| Glass fibers | (6)CS03DE-FT2A | 20 | — | — | — | — | — | 20 | — |
| | (7)CS03DE-FT562 | — | 20 | 35 | — | — | — | — | 15 |
| | (8)CS03MA-FT2A | — | — | — | 20 | — | — | — | — |
| Other fillers | (9)KTL-610 | — | 5 | — | — | — | — | 5 | 5 |
| Melt mixing conditions | Cylinder temp. (°C.) | 330 | 330 | 330 | 330 | — | — | 320 | 320 |
| | Number of screw rotation (rpm) | 100 | 100 | 100 | 100 | — | — | 100 | 100 |
| Injection molding conditions | Cylinder temp. (°C.) | 340 | 340 | 340 | 340 | 285 | 310 | 330 | 330 |
| | Mold temp. (°C.) | 130 | 130 | 130 | 130 | 70 | 130 | 140 | 140 |
| | Injection pressure (kg/cm²) | 900 | 900 | 900 | 900 | 800 | 900 | 950 | 950 |
| *** Damage degree of tooth portion in cage | | ○ | ○ | ○ | x | ○ | ○ | ○ | x |

TABLE 1-continued

| Item | Example 1 | Example 2 | Example 3 | Comp. Example 1 | Comp. Example 2 | Comp. Example 3 | Comp. Example 4 | Comp. Example 5 |
|---|---|---|---|---|---|---|---|---|
| Easiness of incorporating steel balls | c | c | c | x | c | c | c | x |
| Durability (times) of tooth portion in case | 245 | 312 | 189 | 16 | 465 | 485 | 52 | 5 |
| Deformation ratio (%) of cage | 1.25 | 1.36 | 1.01 | *1 | *2 | *2 | 2.24 | *1 |
| Deterioration degree of lubricant | o | o | o | *1 | *2 | *2 | x | *1 |

*1: Testing becoming impossible because of the cage incapable of being incorporated into the bearing races.
*2: The bearing incapable of being continuously operated for 200 hours.
**Proportion of mixing (wt %)
***Test results It is clear from Table 1 that the bearing cages in Example 1 to Example 3 show excellent easiness of insertion during assembling bearings and durability at the tooth portion of the cages compared with cages composed of conventional 6,6-nylon, 4,6-nylon or PPS resins or with those prepared from polyamide compositions containing glass fibers having each a diameter of 13 μm, and that they also show low deformation ratios within a bearing operated at high temperature and do not deteriorate the lubricant.

What is claimed is:

1. A rolling bearing cage prepared from a polyamide resin composition comprising:

an aromatic polyamide which comprises (a) aromatic dicarboxylic acid constituent units comprising 60 to 100% by mole of terephthalic acid constituent units and 0 and 40% by mole or aromatic dicarboxylic acid constituent units other than terephthalic acid constituent units, and (b) straight-chain aliphatic alkylenediamine constituent units having each 6 to 18 carbon atoms, said aromatic polyamide having an intrinsic viscosity [η] of 0.5 to 3.0 dl/g as measured in concentrated sulfuric acid at 30° C; and glass fibers having each a diameter of 3 to 7 μm.

2. The rolling bearing cage as claimed in claim 1 wherein an amount of the glass fibers is 1 to 80% by weight.

3. The rolling bearing cage as claimed in claim 1 wherein the glass fibers is 5 to 50% by weight.

4. The rolling bearing cage as claimed in claim 1 wherein the aromatic discarboxylic acid constituent units other than terephthalic acid constituent units are derived from isophthalic acid, phthalic acid, 2-methyl-terephthalic acid or naphthalenedicarboxylic acid.

5. The rolling bearing cage as claimed in claim 1 wherein the straight-chain aliphatic alkylenediame constituent units are derived from 1,6-diaminohexane, 1,7-diaminoheptane, 1,9-diaminononane, 1,10-diaminodecane, 1,11-diaminoundecane, or 1,12-diaminododecane.

* * * * *

UNITED STATES PATENT AND TRADEMARK OFFICE
CERTIFICATE OF CORRECTION

PATENT NO. : 5,118,207
DATED : June 2, 1992
INVENTOR(S) : IKEJIRI, ET AL.

It is certified that error appears in the above-identified patent and that said Letters Patent is hereby corrected as shown below:

On the title page, item:

[75] Inventors: change "Noboru Umemto" to --Noboru Umemoto--.

Signed and Sealed this

Nineteenth Day of October, 1993

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,118,207
DATED : June 2, 1992
INVENTOR(S) : Fumitoshi Ikejiri; Noboru Umemoto It is certified that error appears in the above-identified patent and that said Letters Patent is hereby corrected as shown below:

Column 9, line 32, after "0" delete "and", insert --to-- and delete "or" and insert --of--.

Signed and Sealed this

Eleventh Day of October, 1994

Attest:

BRUCE LEHMAN

*Attesting Officer*     *Commissioner of Patents and Trademarks*